US012607131B2

(12) United States Patent
Mariotti

(10) Patent No.: US 12,607,131 B2
(45) Date of Patent: Apr. 21, 2026

(54) TURBOMACHINE WITH CANTILEVERED ROTOR WHEEL FOR INDUSTRIAL POWER PLANTS

(71) Applicant: EXERGY INTERNATIONAL S.R.L., Olgiate Olona (IT)

(72) Inventor: Gabriele Mariotti, Olgiate Olona (IT)

(73) Assignee: EXERGY INTERNATIONAL S.R.L., Olgiate Olona (IT)

( * ) Notice: Subject to any disclaimer, the term of this patent is extended or adjusted under 35 U.S.C. 154(b) by 150 days.

(21) Appl. No.: 18/686,988

(22) PCT Filed: Aug. 24, 2022

(86) PCT No.: PCT/IB2022/057931

§ 371 (c)(1),
(2) Date: Feb. 27, 2024

(87) PCT Pub. No.: WO2023/031736

PCT Pub. Date: Mar. 9, 2023

(65) Prior Publication Data

US 2024/0384662 A1      Nov. 21, 2024

(30) Foreign Application Priority Data

Aug. 30, 2021     (IT) ......................... 102021000022550

(51) Int. Cl.
   *F01D 15/12* (2006.01)
   *F01D 15/10* (2006.01)
   (Continued)
(52) U.S. Cl.
   CPC ............. *F01D 15/12* (2013.01); *F01D 15/10* (2013.01); *F01D 25/16* (2013.01); *F02C 7/36* (2013.01)

(58) Field of Classification Search
   CPC .......... F01D 15/12; F01D 15/10; F01D 25/16; F02C 7/36; F04D 13/00; F04D 13/02; F04D 13/028
   See application file for complete search history.

(56) References Cited

U.S. PATENT DOCUMENTS 3,597,105 A      8/1971   Sadler et al.
4,969,805 A  *  11/1990   Romeo ................. F01D 25/285
                                                        417/407
(Continued)

FOREIGN PATENT DOCUMENTS

DE         10 86 127 B       7/1960
FR              1129545 A  *  5/1955   ........... F04D 13/028
(Continued)

OTHER PUBLICATIONS

Dungs, Sascha et al., "Rotor for a Gas Turbine Having an Anti-rotation Device for a Shaft Nut," EPO, EP 2927425 A1 Machine Translation, Oct. 7, 2015 (Year: 2015).*
(Continued)

*Primary Examiner* — Nathaniel E Wiehe
*Assistant Examiner* — Joshua R Beebe
(74) *Attorney, Agent, or Firm* — Oliff PLC

(57) ABSTRACT

A turbomachine with a cantilevered rotor wheel for industrial power plants includes a fixed case, a main shaft mounted in the fixed case and carrying a bladed rotor wheel, a main pinion on the main shaft. A gearbox is connected to the fixed case and carries a transmission shaft configured to be connected to an operating or driving machine. A gear assembly is mounted in the gearbox, coupled to the transmission shaft and to the main pinion, to act as a speed increaser or speed reducer. A portion of the gearbox is removably connected to the fixed case and supports the gear assembly and the transmission shaft, so that the gearbox can (Continued)

be separated from the fixed case and the gear assembly with the transmission shaft from the main shaft.

21 Claims, 4 Drawing Sheets

(51) Int. Cl.
    *F01D 25/16*        (2006.01)
    *F02C 7/36*         (2006.01)

(56)              References Cited

U.S. PATENT DOCUMENTS

| | | | | |
|---|---|---|---|---|
| 5,743,094 | A * | 4/1998 | Zimron | F01D 25/125 |
| | | | | 60/656 |
| 7,195,417 | B2 | 3/2007 | Shiao et al. | |
| 10,859,138 | B2 * | 12/2020 | Felisa | F16H 1/2863 |
| 2010/0113210 | A1 * | 5/2010 | Lopez | F03D 15/10 |
| | | | | 475/331 |
| 2011/0133469 | A1 * | 6/2011 | Jansen | H02K 7/116 |
| | | | | 290/55 |
| 2014/0261288 | A1 * | 9/2014 | Coney | F02G 3/00 |
| | | | | 123/197.1 |
| 2015/0037136 | A1 * | 2/2015 | Fairman | F01D 5/225 |
| | | | | 415/68 |
| 2015/0065292 | A1 * | 3/2015 | Kurth | F16H 1/46 |
| | | | | 475/337 |
| 2021/0017911 | A1 | 1/2021 | Spruce | |

FOREIGN PATENT DOCUMENTS

| | | | | |
|---|---|---|---|---|
| WO | 2010/106569 | A1 | 9/2010 | |
| WO | WO-2010106570 | A1 * | 9/2010 | ............. F01D 25/16 |
| WO | 2012/093299 | A1 | 7/2012 | |
| WO | 2015/176852 | A1 | 11/2015 | |
| WO | 2016/148329 | A1 | 9/2016 | |

OTHER PUBLICATIONS

Oct. 24, 2022 International Search Report issued in International Patent Application No. PCT/IB2022/057931.
Oct. 24, 2022 Written Opinion issued in International Patent Application No. PCT/IB2022/057931.

* cited by examiner

TURBOMACHINE WITH CANTILEVERED ROTOR WHEEL FOR INDUSTRIAL POWER PLANTS

FIELD OF THE INVENTION

The present invention relates to a turbomachine with a cantilevered rotor wheel for industrial power plants.

The present invention applies to both centrifugal (outflow) and centripetal (in-flow) radial turbomachines.

The present invention applies to both driving turbomachines (turbines) and operating turbomachines (compressors).

Specifically, the present invention relates to turbomachines with a cantilevered rotor wheel having a speed reducer or a speed increaser for coupling to an operating machine (e.g. generator) or a driving machine (e.g. engine).

Preferably but not exclusively, the cantilevered rotor wheel turbomachine of the present invention is an expansion turbine used in apparatus for the production of energy, in particular electricity, for example but not exclusively through water vapor Rankine cycle or organic Rankine cycle (ORC).

BACKGROUND OF THE INVENTION

A turbine with a cantilevered rotor wheel is illustrated, for example, in public documents WO2010106569A1, WO2010106570A1 and WO2012093299.

WO2010106569A1 discloses a gas and vapor expansion turbine comprising a casing with a volute for passing fluid from an inlet passage to an outlet passage through at least one stator assembly and a rotor assembly, a front shield extending radially from said volute towards an axis of the turbine shaft, an outer tube fixed in front of said shield or said volute designed to support the turbine shaft with the interposition of a support assembly, wherein the turbine shaft has a head supporting the rotor assembly.

WO2010106570A1 discloses the structure of a gas and vapor expansion turbine comprising a casing with a peripheral volute for transit of the working fluid from an inlet passage to an outlet passage, at least one first stator and possible subsequent stators, a turbine shaft rotating about an axis and carrying at least one first rotor and possible subsequent rotors working together downstream of the first stator and subsequent rotors. An outer tubular element protrudes frontally from the casing and is coaxial with the rotating shaft of the turbine. Between the tubular element and the turbine shaft is positioned a support unit removable in block from the outer tubular element excluding the shaft.

WO2012093299 discloses an expansion turbine comprising: a case having an inlet and an outlet for a working fluid, a stator installed within the case, a rotor installed within the case and rotating about a respective axis of revolution, a sleeve constrained to the case, a mechanical unit installed within the sleeve. The mechanical unit comprises a bushing and a shaft rotatably installed within the bushing. The shaft is removably connected to the rotor and the entire mechanical unit, including the shaft, is removable from the quill from the side opposite the rotor.

In order to correctly couple a turbomachine, such as a turbine, to a driving or operating machine, such as a generator, it is well known to use speed increasers or speed reducers. In fact, for example, for turbines with relatively small fluid flow rates it is convenient to design and operate the machine at high speed so as to maximize efficiency and reduce the size which is substantially related to the cost of production. Unlike the turbine, the optimum rotational speed of the generator coupled to it is a function of the grid frequency and the number of stator poles and is independent of the conditions of the fluid operating in the turbine. The maximum speed of rotation of the generator is often too slow for the coupling of small turbines that process gases or vapors with a high enthalpy content, for which the interposition of a speed reducer is required.

For instance, the typical configuration for a turbo-alternator involves the speed reducer interposed between the turbine and the generator and connected by means of connection joints, i.e. elements that transmit the torque without exerting significant lateral actions in the presence of modest misalignments between the rotation axes of the machines. In this configuration, the speed reducer comprises at least two shafts connected by means of gears and supported, respectively, by a pair of bearings. The fast shaft of the speed reducer connected to the turbine through the joint with the respective toothing is called pinion while the slower driven shaft is connected to the alternator. The speed reducer is a separate machine with respect to the turbine and the alternator and comprises a case that completely supports the stresses generated by the toothing and discharges them directly onto the foundation of the turbo-alternator.

A further configuration envisages installing the turbine blading on a shaft of the speed reducer to form an integrated machine which, however, maintains the architecture of the speed reducer as regards the arrangement of the shafts, supports and their dismantling and maintenance.

Speed reducers associated with turbomachines are illustrated in documents WO2016148329A1, WO2015176852A1, FR1129545A, DE1086127B, U.S. Pat. No. 3,597,105A.

WO2016148329A1 discloses a turbo-expander comprising a turbine having a rotating shaft, a speed reducer having a gear connected to the rotating shaft of the turbine and an output shaft connected to the gear, a generator connected to the output shaft of the speed reducer to generate electricity.

WO2015176852A1 discloses a "turbomachine—electric machine" assembly comprising a turbomachine, an electric machine and a speed reducer connecting the turbomachine to the electric machine with a fixed reduction ratio. The speed reducer is a fixed planetary mechanism of the friction type.

FR1129545A discloses a pump comprising a bladed rotor wheel mounted on a shaft carrying a pinion gear. A gearbox is connected to the housing containing the rotor wheel. The gearbox carries a shaft and gears coupled to the pinion gear. The housing with the rotor wheel is connected to the gearbox by bolts.

DE1086127B discloses a centrifugal pump having a gearbox with planetary gears. A rotor wheel of the pump is carried by a shaft having a pinion gear engaged with planetary gears connected to the shaft of the gearbox.

U.S. Pat. No. 3,597,105A discloses a centrifugal pump coupled to a gearbox. The shaft carrying the rotor wheel is coupled to a housing containing it by means of bearings and also carries a pinion engaged with an annular gear part of a hub. The gearbox is attached to the rotor wheel housing by a screw engaged in the shaft carrying the bearings on which the hub rotates.

SUMMARY

In the field of turbomachines with a cantilevered rotor wheel equipped with a speed reducer/increaser used in industrial power plants, the Applicant has observed that the adoption of speed reducers connected to the turbomachine (e.g. turbine) and to the driving or operating machine (e.g. alternator) by means of coupling joints, as described above, makes the assembly very bulky.

The Applicant further observed that for the turbomachines with cantilevered rotor wheel equipped with integrated speed reducer/increaser, the assembly and disassembly of the turbomachine, which has to be carried out, for example, on site to carry out inspection, maintenance and/or repair operations, are complex and slow.

Thus, the Applicant perceived a need to propose a new configuration of a cantilevered rotor wheel turbomachine for industrial power plants that improves upon the known turbomachines described above in several respects.

The Applicant has, in particular but not exclusively, set itself the following objectives:

to simplify and speed up the assembly and disassembly operations of these turbomachines while ensuring the precision of the coupling between the rotor wheel and the speed reducer/increaser, in particular the reciprocal centering around the axis of rotation;

to minimize the footprint of these turbomachines, e.g. to facilitate transport and installation;

to minimize the mechanical losses of the speed reducer/increaser assembly.

Applicant has found that the above objectives and others can be achieved by coupling the speed reducer/increaser to the turbomachine both rigidly and removably. Specifically, the speed reducer/increaser is mounted in a gearbox that is removably constrained to a fixed case that carries a bladed rotor wheel of the turbomachine and a main shaft of said rotor wheel is exploited to key a pinion of the speed reducer/increaser to it.

The invention relates to a turbomachine, a plant and methods according to the appended claims.

More specifically, according to an independent aspect, the present invention relates to a turbomachine with a cantilevered rotor wheel for industrial power plants, comprising:

a fixed case;

a main shaft mounted in the fixed case;

support elements operatively interposed between the main shaft and the fixed case and configured to allow rotation of the main shaft in said fixed case;

at least one bladed rotor wheel mounted at a first end of the main shaft so as to be supported cantilevered with respect to the support elements; wherein a second end of the main shaft, opposite the first end, protrudes from the fixed case;

a main pinion on the second end of the main shaft;

a gearbox rigidly connected to the fixed case;

a transmission shaft rotatably mounted in the gearbox;

a gear assembly mounted in the gearbox, coupled to the transmission shaft and coupled to the main pinion, to act as a speed increaser or speed reducer between the bladed rotor wheel and the transmission shaft;

wherein at least one portion of the gearbox is removably connected to said fixed case; wherein said at least one portion supports the gear assembly and the transmission shaft, so that said at least one portion of the gearbox can be separated from the fixed case and so that the gearbox assembly with the transmission shaft can be separated from the main shaft.

The main pinion is either made in one piece with the main shaft or mounted, for example keyed, on the second end of the main shaft.

Said at least one portion is directly or indirectly connected to the fixed case.

The transmission shaft has a distal end, for example configured to be connected to an operating machine or a driving machine.

The Applicant has first of all verified that the solution according to the invention allows to assemble and disassemble the turbomachine with precision, speed and relative simplicity, always guaranteeing the reciprocal alignment between the rotor wheel and the speed increaser/reducer. Removing the gearbox, in fact, allows to disassemble en-bloc the gear assembly and the transmission shaft. The same gearbox, when reassembled, guarantees the centering of the gear assembly with respect to the bladed rotor wheel.

The Applicant has also verified that the solution according to the invention makes it possible to contain the overall dimensions of the turbomachine and to minimize mechanical losses due to the fact that the pinion of the speed increaser/reducer is placed on the main shaft of the rotor wheel and the gear assembly is therefore placed close to the main shaft.

Further aspects of the invention are described below.

In one aspect, separable connecting elements, for example screws or bolts, are configured to removably connect the fixed case to the gearbox.

In one aspect, the entire gearbox is removably connected, directly or indirectly, to the fixed case.

In one aspect, the main shaft and the transmission shaft are aligned relative to each other and coaxial with each other.

In one aspect, there is provided a support assembly mounted in the fixed case and comprising support elements.

In one aspect, the gearbox is rigidly connected to the support assembly.

In one aspect, the support assembly is mounted in the fixed case so that it can be extracted.

In one aspect, said support assembly may be inserted into or extracted from the fixed case by a displacement of at least a portion of the gearbox relative to the fixed case.

In one aspect, the support assembly is mounted in a cylindrical seat of the fixed case optionally bounded in a tubular body of said fixed case.

In one aspect, separable connecting elements, such as screws or bolts, are configured to removably connect the support assembly to the gearbox and/or to removably connect the support assembly, the gearbox and the fixed case to each other.

The Applicant has verified that the above described structure allows to access also to the main shaft support elements with precision, speed and relative simplicity for the above mentioned control, maintenance and repair operations and to always ensure the perfect reciprocal alignment between the parts, e.g. between main shaft and support elements, between support elements and fixed case, between speed reducer/increaser and main shaft, even after several disassembly/reassembly operations. As a result, the efficiency and reliability of the turbomachine over time are guaranteed.

In one aspect, the main pinion is connected to the second end of the main shaft via a mechanical engagement, for example a cylindrical connection with keys or a HIRTH front toothing or via a splined profile.

In one aspect, the support assembly comprises a sleeve and bearings mounted in the sleeve, wherein the main shaft is supported by the bearings.

In one aspect, the gearbox is rigidly connected to the sleeve.

In one aspect, the gearbox comprises a first axial portion and a second axial portion connected together by separable connecting elements, for example screws or bolts.

In one aspect, said at least one portion is the first axial portion or the second axial portion.

In one aspect, the second axial portion is rigidly connected to the support assembly.

In one aspect, the second axial portion is rigidly connected to the sleeve.

In one aspect, a rear end of the sleeve protrudes from the fixed case and the second axial portion is rigidly connected to said rear end.

In one aspect, the separable connecting elements are configured to removably connect the sleeve to the gearbox and/or to removably connect the sleeve, the gearbox and the fixed case to each other.

In one aspect, the second axial portion is made by machining it together with the sleeve of the support assembly.

This structure and the above mentioned machining allow to precisely center the gear assembly with the axis of the main shaft of the turbomachine.

In one aspect, the first axial portion supports the gear assembly and the transmission shaft.

In an alternative aspect, the second axial portion supports the gear assembly and transmission shaft.

In one aspect, the main shaft is connected to the bladed rotor wheel via a removable connection and is extractable from the fixed case while the bladed rotor wheel remains in said fixed case.

In one aspect, it is possible to insert or extract said main shaft into or from the fixed case by displacement of said at least one portion of the gearbox relative to the fixed case.

Therefore, disassembly and assembly on site of the support assembly and possibly also of the main shaft, for example for maintenance purposes, are accurate and relatively simple and fast. Above all, there is no need for complicated alignment operations that would be necessary if the support assembly and the gearbox were supported separately.

In one aspect, the main shaft is axially integral with the support assembly.

In one aspect, it is possible to insert or extract said support assembly and said main shaft into or from the fixed case by displacing said at least a portion of the gearbox relative to the fixed case.

In one aspect, the main shaft is separably constrained to the bladed rotor wheel.

In one aspect, the bladed rotor wheel is lockable in the fixed case.

In one aspect, locking devices are configured to lock the bladed rotor wheel in the fixed case.

In one aspect, the locking devices comprise screws that pass through the fixed case, optionally through a back wall of the fixed case, and engage the bladed rotor wheel.

In this way, it is possible to extract the support assembly and the main shaft from the fixed case while leaving the bladed rotor wheel in the fixed case.

In one aspect, the bladed rotor wheel is axially movable between a forward working position in which it is free to rotate in the fixed case and a rearward locking position in which it rests tightly against the fixed case, optionally as illustrated in WO2012/093299.

In this way, the support assembly and main shaft can be extracted from the fixed case, ensuring that the process fluid is sealed in the turbomachine. Thus, the turbomachine does not have to be emptied to perform maintenance/repair operations.

In one aspect, the gear assembly comprises a transmission pinion on the transmission shaft, for example made of piece with the transmission shaft or mounted, for example keyed, on said transmission shaft.

In one aspect, the gear assembly comprises at least two driven shafts rotatably mounted in the gearbox.

In one aspect, each of said at least two driven shafts comprises a first driven wheel engaged with the main pinion and a second driven wheel engaged with the drive pinion.

In one aspect, said at least two driven shafts are angularly arranged equi-spaced around the main shaft and the transmission shaft.

In one aspect, the driven shafts are at least three.

In one aspect, the driven shafts are three angularly spaced 120° apart from each other.

In one aspect, the driven shafts are parallel to the main shaft and to the transmission shaft.

This arrangement of the shafts and driven wheels with respect to the main shaft and main pinion makes it possible to cancel or minimize radial actions on the main shaft. The transmission of motion between the main shaft and the gear assembly does not produce substantial lateral actions. In this way it is possible to use the configuration of the bearings of a turbomachine designed for direct coupling, i.e. bearings designed considering that the transmission of the mechanical power occurs by the action of the torque only with respect to the axis of rotation without developing lateral forces, as it happens on a shaft of a speed reducer or increaser with parallel axes.

In one aspect, axially yielding supports are operatively interposed between the driven shafts and the gearbox.

In one aspect, axially yielding supports are disposed at at least one end of each driven shaft.

In one aspect, the axially yielding supports comprise disc springs.

In one aspect, the main pinion and the first driven wheels are helical.

In one aspect, the drive pinion and the second driven wheels are helical.

In one aspect, an angle of the helix of the helical wheels is less than or equal to 15°, optionally less than or equal to 10°.

The axially yielding supports and the helical wheels allow an equalization of the forces exchanged on the teeth. The axially yielding supports always guarantee contact between the teeth of the pinions and the driven wheels, even in the presence of geometric unevenness in the toothing. If a pair of driven wheels meshes before the others due to tolerances or machining errors, the axial force generated by the helix angle, counteracted by the spring force, causes the driven shaft to move axially, restoring contact on the other wheels and equalizing the forces on the teeth.

In an aspect, a tie rod is removably housed in an axial through-hole of the main shaft, connected to the bladed rotor wheel and configured to join said main shaft and said bladed rotor wheel.

In one aspect, an end of the tie rod opposite the bladed rotor wheel is located in a seat fashioned in a proximal end of the transmission shaft.

In one aspect, the distal end of the transmission shaft protrudes from the gearbox.

In one aspect, the distal end of the transmission shaft is connected or connectable to the operating machine or the driving machine, optionally via a joint.

In one aspect, a separable connecting element is configured to lock the tie rod and the main shaft together when said tie rod is housed in the axial through-hole of the main shaft.

In one aspect, said separable connecting element comprises a nut engageable on an end of the tie rod opposite the bladed rotor wheel.

In one aspect, the invention also relates to a method for disassembling the turbomachine through the following steps:

removing the first axial portion of the gearbox, together with the transmission shaft and the gear assembly, from the second axial portion of said gearbox, disengaging and moving away the first driven wheels from the main pinion;

unlocking the tie rod from the main shaft;

disconnecting the second axial portion of the gearbox and the support assembly from the fixed case;

extracting the support assembly, integral with the second axial portion of the gearbox, together with the main shaft from the fixed case.

In one aspect, it is contemplated that the bladed rotor wheel is locked into the fixed case prior to extracting the support assembly together with the main shaft from the fixed case.

In one aspect, it is contemplated to rest the bladed rotor wheel tightly against an inner surface of the fixed case to prevent spillage of the process liquid prior to extracting the support assembly together with the main shaft from the fixed case, optionally in accordance with WO2012/093299.

In one aspect, the invention also relates to a method of assembling the turbomachine through the following steps:

inserting the support assembly, integral with the second axial portion of the gearbox, together with the main shaft into the fixed case;

constraining the second axial portion of the gearbox and the support assembly to the fixed case;

locking the tie rod with the main shaft;

joining the first axial portion of the gearbox, together with the transmission shaft and the gear assembly, to the second axial portion of said gearbox, engaging the first driven wheels to the main pinion.

In one aspect, the turbomachine is a driving turbomachine.

In one aspect, the turbomachine is for the purpose of generating electricity.

In one aspect, the turbomachine is an expansion turbine, optionally a radial turbine, optionally a centrifugal radial turbine.

In one aspect, the expansion turbine comprises at least one axial stage.

In one aspect, the expansion turbine is of the radial/axial type.

In one aspect, the bladed rotor wheel comprises a rotor disc and at least one array of rotor blades disposed on a face of the rotor disc to form a respective radial stage.

In one aspect, the turbomachine is an operating turbomachine.

In one aspect, the turbomachine is a compressor.

In one aspect, the main pinion, transmission shaft and gear assembly define a speed reducer.

In one aspect, the main pinion, transmission shaft and gear assembly define a speed increaser.

In one aspect, the present invention also relates to an industrial power plant comprising at least one turbomachine with a cantilevered rotor wheel according to at least one of the preceding aspects.

In one aspect, the turbomachine with cantilevered rotor wheel of the industrial plant is an expansion turbine coupled to a generator.

In one aspect, the industrial plant is of the Organic Rankine Cycle (ORC) type.

In one aspect, the industrial plant is configured for heat recovery from high temperature flue gas (e.g. 300-600° C.).

In one aspect, the industrial plant is configured to generate a power of up to 10 MW with enthalpy change greater than 150 kJ/kg.

In one aspect, the expansion turbine has an optimal speed above 3000 RPM.

In one aspect, the generator speed is typically between 1500 RPM and 1800 RPM.

Further features and advantages will appear more from the detailed description of preferred, but not exclusive, embodiments of a turbomachine with a cantilevered rotor wheel for industrial power plants according to the present invention.

DESCRIPTION OF DRAWINGS

Such description will be set forth herein with reference to the accompanying drawings, provided for illustrative purposes only and, therefore, not limiting, in which.

DEFINITIONS

Figure 1:
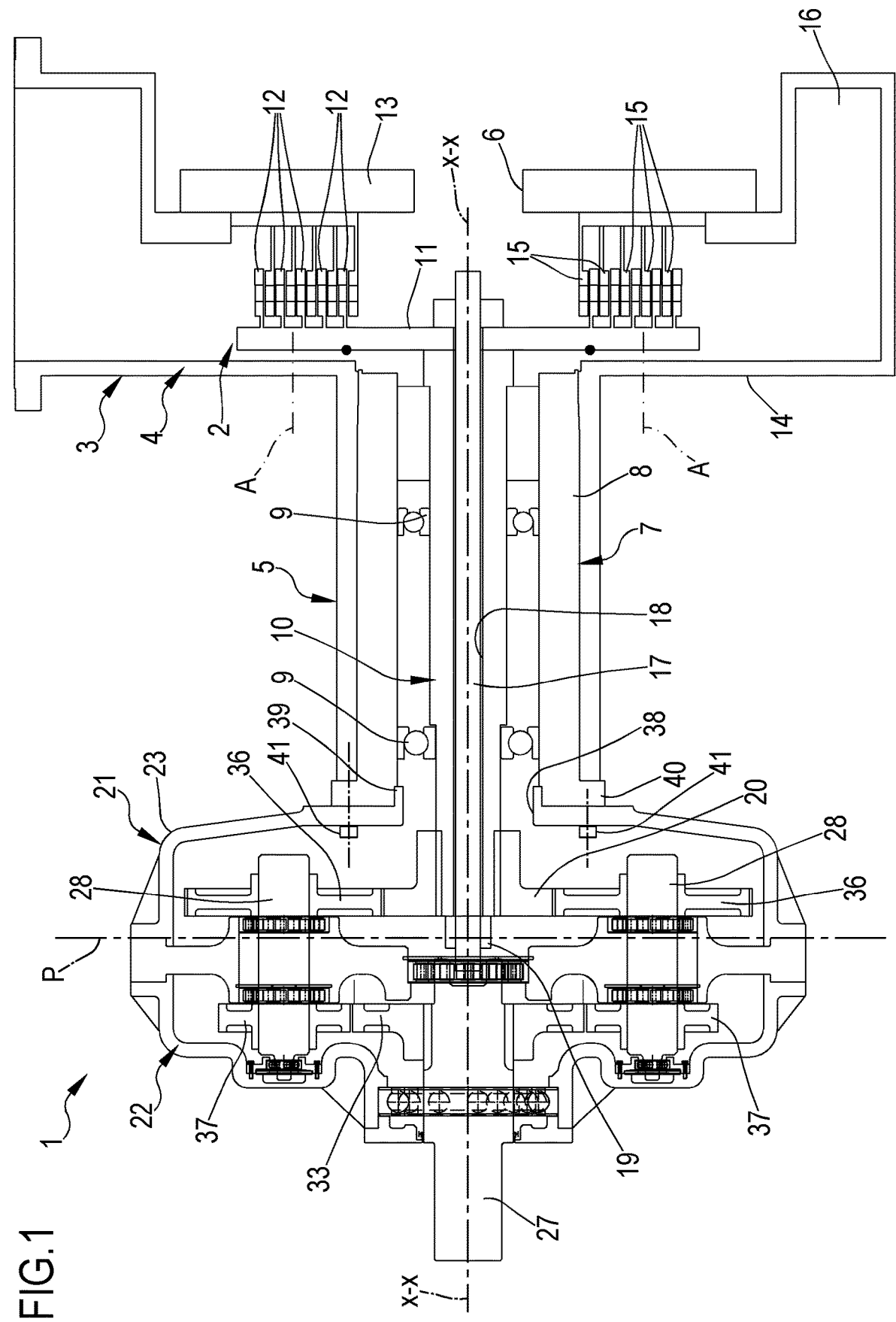
FIG. 1 illustrates a meridian section of a turbomachine according to the present invention.

In the present description and in the appended claims, by the adjectives "separable" and "removable" it is meant that the connection between the parts involved is such as to allow said parts to be dismounted/disassembled without damaging/disrupting said parts and/or the elements enabling said connection and thus to remounting/reassemble said parts one or more times.

In the present description and in the appended claims, by the terms "directly or indirectly" referring to connections, it is meant that the parts can be associated to each other without the interposition of other elements (directly connected) or bound to each other with the interposition of one or more other elements (indirectly connected). In both cases, the connecting elements which bind them (for example: screws, bolts, separable joints) ensure the rigid connection between said parts.

In this description and the appended claims, "rigidly" referring to two connected portions means that, when connected, they form a single body in the sense that they do not move relative to each other.

DETAILED DESCRIPTION

With reference to the above-mentioned figures, a turbomachine with a cantilevered rotor wheel for industrial power plants according to the present invention has been overall indicated with reference numeral 1.

The turbomachine 1 illustrated in FIG. 1, by way of example and not limitation, is an expansion turbine (driving turbomachine) of the radial centrifugal type with a single bladed rotor wheel 2. For example, such a turbine 1 is used in the context of industrial power plants of the Organic Rankine Cycle (ORC) type which, for example, exploit as sources the geothermal resources or for heat recovery from high-temperature fumes (e.g. 300-600° C.). Such plants are for example configured to generate a power of up to 10 MW with enthalpy changes greater than 150 kJ/kg.

The fixed case 3 has a main body 4, in which the bladed rotor wheel 2 is rotatably housed, and a tubular body 5 integral with the main body 4 and emerging cantilevered from the main body 4 on the opposite side from an inlet 6 for a process fluid in the main body 4.

In the tubular body 5 is housed a support assembly 7 comprising a sleeve 8 within which support elements 9 (bearings) are mounted. The support elements 9 support a main shaft 10 so that said main shaft 10 can rotate with respect to the sleeve 8 about a rotation axis "X-X". The coupling between the sleeve 8 and the main shaft 10 is such that said main shaft 10 cannot move along an axial direction with respect to the support assembly 7, i.e. the main shaft 10 is axially integral with the support assembly 7.

The sleeve 8 is housed in a cylindrical seat delimited by the tubular body 5 and the main shaft 10 has a first end, at which the bladed rotor wheel 2 is mounted, and a second end opposite to the first end.

The bladed rotor wheel 2 comprises a rotor disc 11 directly connected to the first end of the main shaft 10 and provided with an own front face and an opposite rear face. The front face carries overhang a plurality of rotor blade arrays 12 coaxial to the rotation axis "X-X" and thus rotating with the rotor disc 11.

The fixed case 3 comprises a front wall 13, located opposite the front face of the rotor disc 11, and a rear wall 14, located opposite the rear face of the rotor disc 11.

The front wall 13 has the aforementioned inlet 6 for the process fluid. The front wall 13 carries overhang a plurality of arrays of stator blades 15 concentric and coaxial to the rotation axis "X-X". Each pair formed by an array of rotor blades 12 and an array of stator blades 15 forms a radial stage of the expansion turbine.

The arrays of stator blades 15 extend from an inner face of the front wall 13 toward the interior of the case 3 and toward the rotor disc 11 and are radially alternating with the arrays of rotor blades 12 to define a radial path of expansion of the process fluid that enters through the inlet 6 and expands radially away toward the periphery of the rotor disc 11 until it enters a transit volute 16 and then exits the fixed case 3 through an outlet not shown.

The main shaft 10 is connected to the bladed rotor wheel 2 by means of a removable connection. In the illustrated exemplary embodiment, such a removable connection is made by means of a tie rod 17 removably housed in an axial through-hole 18 of the main shaft 10. One end of the tie rod 17 is connected to the bladed rotor wheel 2, for example inserted in a central hole of the bladed rotor wheel 2 and locked therein with a nut. One end of the tie rod 17 opposite the bladed rotor wheel 2 protrudes from the main shaft 10 and a separable connecting element 19, for example a respective nut, is configured to lock together the tie rod 17, the main shaft 10 and the bladed rotor wheel 2 when said tie rod 17 is housed in the axial through-hole 18 of the main shaft 10.

The bladed rotor wheel 2 is mounted at the first end of the main shaft 2 so as to be supported cantilevered with respect to the support elements 9.

The second end of the main shaft 10 protrudes from the tubular body 5 and a main pinion 20 is keyed to said second end of the main shaft 10 by means of a mechanical engagement, for example by means of a cylindrical connection with tongues or a HIRTH front toothing or by means of a splined profile.

The turbomachine 1 further comprises a gearbox 21 rigidly but removably connected to the fixed case 3. In the illustrated embodiment, the gearbox 21 has a substantially cylindrical shape and comprises a first axial portion 22 and a second axial portion 23 connected to each other by means of removable connecting elements, for example screws or bolts not illustrated, at a plane "P" orthogonal to a central axis which, when the turbomachine 1 is assembled, matches with the rotation axis "X-X".

Figure 3:
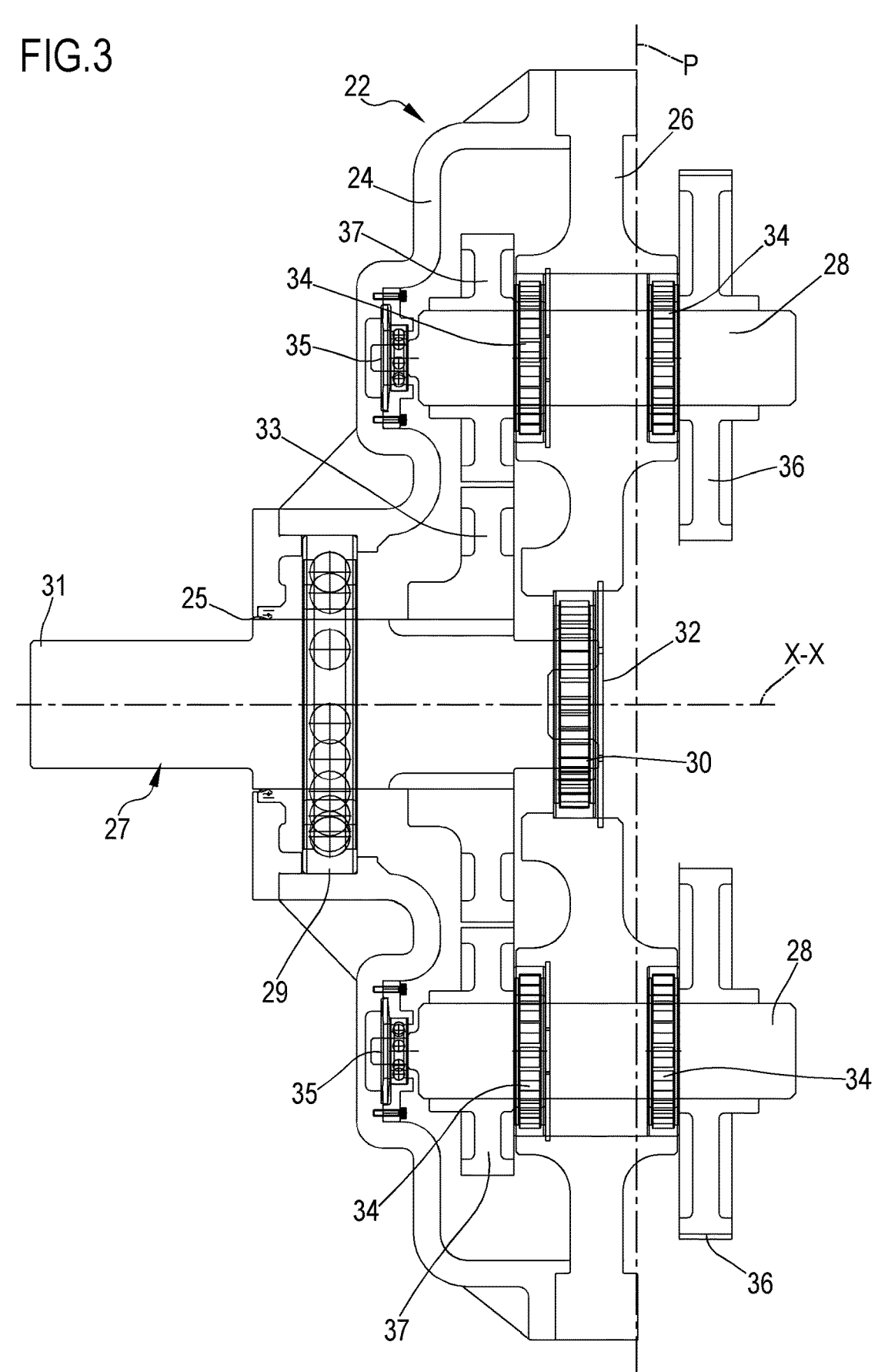
FIG. 3 shows an enlarged part of the turbomachine of FIG. 2.

The first axial portion 22 comprises (FIG. 3) a first shell 24 having a central opening 25 and a support 26. The support 26 is constrained to the first shell 24 at a peripheral edge of the first shell 24.

The support 26 and the first shell 24 together carry a transmission shaft 27 and three driven shafts 28.

The transmission shaft 27 is rotatably supported in the first axial portion 22 by means of a first bearing 29 mounted in a respective seat formed in the first shell 24 and near the central opening 25 and by means of a second bearing 30 mounted in a respective seat formed in a central area of the support 26. The transmission shaft 27 has a distal end 31 which exits the gearbox 21 through the central opening 25 and is configured to be connected to a generator/alternator via a joint, not shown. The second bearing 30 is keyed to a proximal end 32 of the transmission shaft 27 opposite the distal end 31.

A drive pinion 33 is keyed to the transmission shaft 27 and is axially disposed between the first bearing 29 and the second bearing 30.

The three driven shafts 28 are parallel to the transmission shaft 27 and arranged around said transmission shaft 27 angularly spaced 120° apart from each other.

Each of the three driven shafts 28 is rotatably supported in the first axial portion 22 by means of two bearings 34 mounted in respective seats axially spaced apart from each other and formed in the support 26. Each of the three driven shafts 28 also has its own end coupled to the first shell 24 by means of an axially yielding support 35 defined by a disc spring.

Each of the driven shafts 28 further comprises a first driven wheel 36 keyed near an end of the driven shaft 28 opposite to that associated with the disc spring. Said first driven wheel 36 is engaged with the main pinion 20 (FIG. 1). A second driven wheel 37 is keyed to each driven shaft 28 in proximity to the disc spring and is engaged with the drive pinion 33.

The drive pinion 33 and the two driven shafts 28 with their respective first and second driven wheels 36, 37 define a gear assembly mounted in the gearbox 21, coupled to the transmission shaft 27 and to the main pinion 20, to act as a speed reducer between the bladed rotor wheel 2 and the transmission shaft 27.

The main pinion 20, the first driven wheels 36, the second driven wheels 37 and the transmission pinion 33 are of the helical type with a low helix angle, for example less than 10°, in order to allow an equalization of the forces exchanged on the teeth. The axially yielding supports 35 always ensure contact between the teeth of the pinions and the driven wheels even in the presence of geometric unevenness in the toothing.

Figure 2:
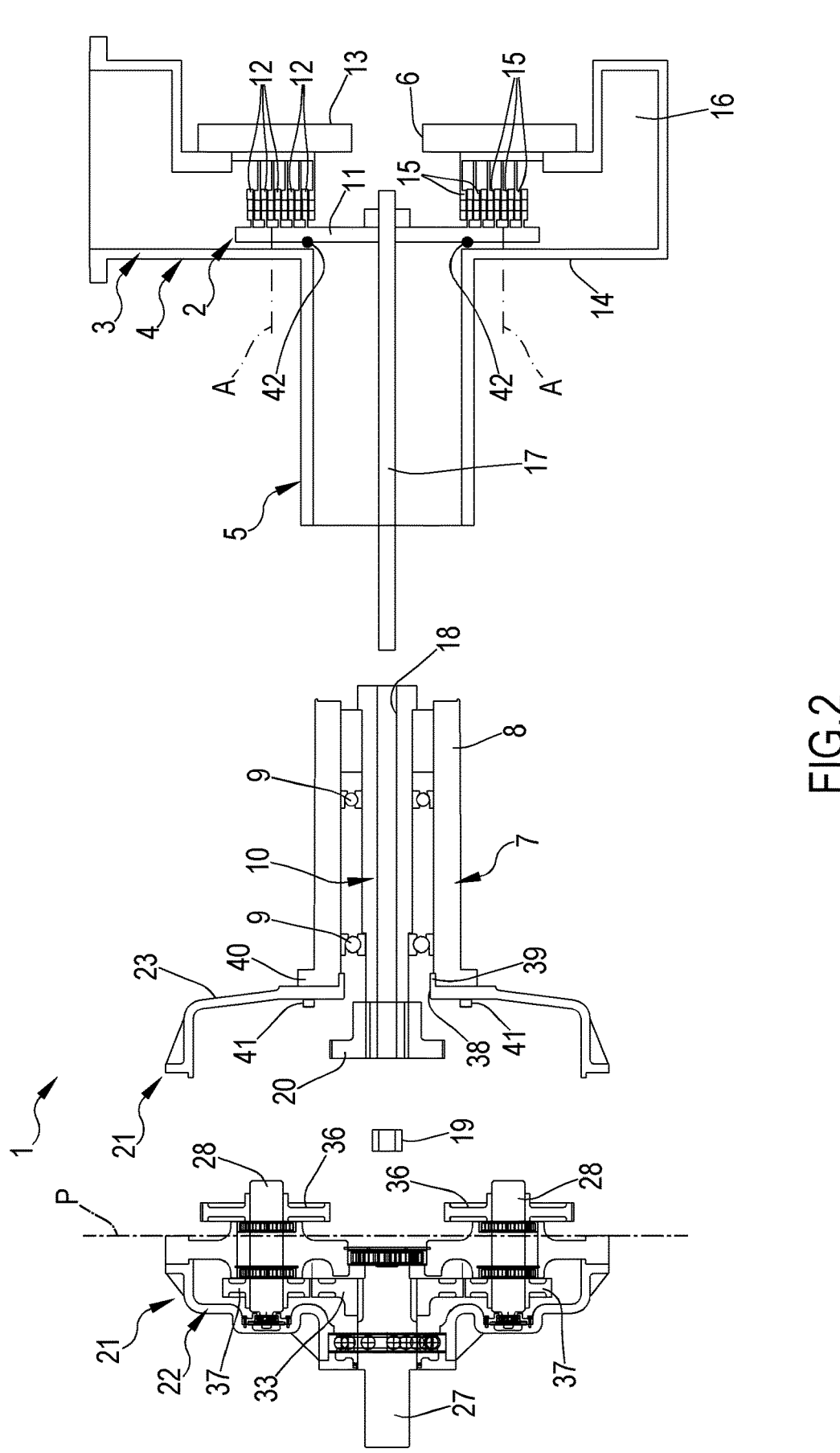
FIG. 2 shows the turbomachine of FIG. 1 in a partially disassembled configuration.

The second axial portion 23 is defined by a second shell having a respective central opening 38 (FIGS. 1 and 2). At said central opening 38 there is obtained a tubular projection 39 inserted through an opening of a rear end of the sleeve 8 which protrudes from the tubular body 5 of the fixed case 3. The sleeve 8 further has a radially outer annular portion 40 axially interposed between the tubular body 5 and an annular area of the second axial portion 23 disposed around the central opening 38 thereof.

Separable connecting elements 41, for example screws or bolts, are arranged around the central opening 38 of the second axial portion 23 and are engaged with the annular area and the radially outer annular portion 40 to lock the second axial portion 23 and the sleeve 8 together. In addition, at least some of the aforementioned separable connecting elements 41 also engage with the tubular body 5 so as to lock the second axial portion 23, the sleeve 8 and the tubular body 5 together. For example, some screws traverse the annular zone and engage threaded holes formed in the annular portion 40 without engaging the tubular body 5. Other screws traverse the annular zone, traverse holes formed in the annular portion 40 and engage threaded holes formed in the tubular body 5.

The first axial portion 22 of the gearbox 21 is then connected to the fixed case 3 indirectly, through the second portion 23 and the support assembly 7.

The second axial portion 23 is preferably made by machining it together with the sleeve 8 of the support assembly 7 so as to precisely center the gear assembly with the axis of the main shaft 10 of the turbomachine 1.

When the turbomachine 1 is in the assembled configuration of FIG. 1, the gearbox 21 is rigidly connected to the support assembly 7 and to the fixed case 3, the gear assembly is operatively connected to the main pinion 20 and therefore to the bladed rotor wheel 2. The main shaft 10 and the transmission shaft 27 are aligned with respect to each other and coaxial to each other. The end of the tie rod 17 opposite the bladed rotor wheel 2 can be housed in a seat formed in a proximal end of the transmission shaft 27 so as to further contain the axial dimensions of the expansion turbine.

The bladed rotor wheel 2 is free to rotate, by the action of the process fluid, and its rotation is transmitted to the transmission shaft 27 through the main shaft 10, the main pinion 20 and the gear assembly which provide for reducing the speed of the bladed rotor wheel 2. For example, the bladed rotor wheel 2 rotates at 3000 RPM and the transmission shaft 27 with the generator connected thereto, not shown, at 1500 RPM.

Figure 4:
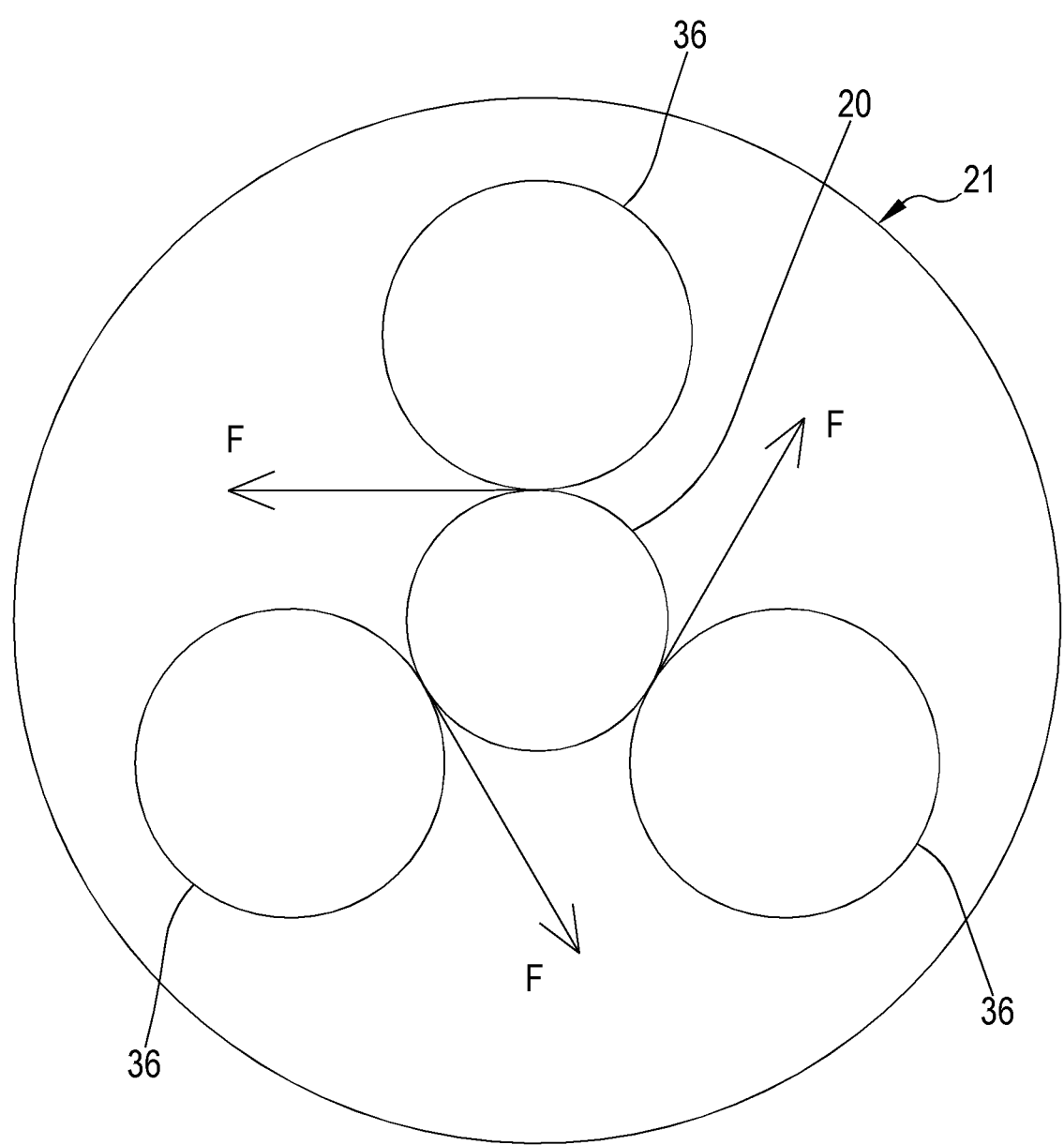
FIG. 4 is a schematic frontal view of some elements of the turbomachine referred to in the previous figures.

As schematically depicted in FIG. 4, the arrangement of the driven wheels 36 with respect to the main shaft 10 and the main pinion 20 allows the radial actions on the main shaft 10 to be cancelled or minimized.

When maintenance or repair is required, the rotation of the bladed rotor wheel 2 is first stopped. Thereafter, the first axial portion 22 of the gearbox 21 is separated from the second axial portion by removing the separable connecting elements and then axially moving en-bloc the first axial portion 22 with the transmission shaft 27 and the gear assembly away from the second axial portion 23.

At this point, the screws which pass through the annular area, the annular portion 40 and engage in the threaded holes formed in the tubular body 5 are extracted, leaving the others in place.

The assembly comprising the second axial portion 23, the support assembly 7, the main shaft 10 with the main pinion 20, the tie rod 17 and the bladed rotor wheel 2 is moved axially for a short stroke (towards the left in FIG. 1) until the bladed rotor wheel 2 is brought to a rearward position and resting against the fixed case 3. In particular, until a sealing ring 42 positioned on a rear face of the bladed rotor wheel 2 rests against an inner surface of the main body 4 of the fixed case 3, for example as illustrated in WO2012/093299. Thereupon, the bladed rotor wheel 2 is locked into the fixed case 3 by means of devices suitable for that purpose. For example, such locking devices comprise screws which pass through the rear wall 14 of the fixed case and engage in the bladed rotor wheel 2. In FIGS. 1 and 2, only the axes "A" of such screws are illustrated for simplicity.

Thereafter, the nut 19 is removed from the tie rod 17 and the second axial portion 23, the support assembly 7 and the main shaft 10 with the main pinion 20, which are axially joined to each other, are axially moved en-bloc (towards the left in FIG. 2), extracting the support assembly 7 and the shaft 10 from the tubular body 5 while the tie rod 17 remains in place.

Thus, as illustrated above, the gearbox 21 can be separated from the fixed case 3 and the gear assembly with the transmission shaft 27 can be easily separated from the main shaft 10 and extracted from the fixed case 3. In particular, the displacement of the second portion 23 of the gearbox 21 allows the support assembly 7 to be extracted together with the main shaft 10.

To reassemble the turbomachine 1 after repair/maintenance, simply carry out the operations described above in reverse order.

In an embodiment variant, not illustrated in the accompanying drawings, the second portion 23 of the gearbox 21 is directly constrained to the fixed case 3, without the interposition of the radially outer annular portion 40 of the support assembly 7, and it is thus possible to disassemble only the gearbox 21 leaving in place the support assembly 7 which can be eventually disassembled later.

In an embodiment variant, not illustrated in the accompanying drawings, the gear assembly and the transmission shaft 27 are carried by the second axial portion 23 instead of the first axial portion 22.

In other embodiments not illustrated, the turbomachine may be an expansion turbine as illustrated but additionally provided with an axial stage (expansion turbine is of the radial/axial type). For example, rotor blades of said axial stage are mounted on a radially peripheral edge of the rotor disc 11.

In other embodiments not shown, the turbomachine 1 is a compressor (operating turbomachine) and the main pinion 20, the transmission shaft 27 and the gear assembly define a speed increaser instead of a speed reducer.

LIST OF ELEMENTS

1 turbomachine with cantilevered rotor wheel
2 bladed rotor wheel
3 fixed case
4 main body
5 tubular body
6 inlet
7 support assembly
8 sleeve
9 support elements
10 main shaft
11 rotor disc
12 rotor blades
13 front wall
14 rear wall
15 stator blades
16 transit volute
17 tie rod
18 axial through-hole
19 separable connection
20 main pinion
21 gearbox

13

22 first axial portion
23 second axial portion
24 first shell
25 first shell central opening
26 support
27 transmission shaft
28 driven shafts
29 first bearing
30 second bearing
31 distal end
32 proximal end
33 drive pinion
34 bearings
35 axially yielding support
36 first driven wheel
37 second driven wheel
38 second shell central opening
39 tubular projection
40 radially outer annular portion
41 separable connecting elements
42 sealing ring
A screws axes

The invention claimed is:

1. A turbomachine with cantilevered rotor wheel for industrial power plants, comprising:
a fixed case;
a main shaft mounted in the fixed case;
support elements operatively interposed between the main shaft and the fixed case and configured to allow rotation of the main shaft in the fixed case;
a support assembly mounted in the fixed case and comprising the support elements;
at least one bladed rotor wheel housed in the fixed case and mounted at a first end of the main shaft so as to be supported cantilevered with respect to the support elements; wherein a second end of the main shaft, opposite the first end, protrudes from the fixed case;
a main pinion on the second end of the main shaft;
a gearbox rigidly connected to the fixed case;
a transmission shaft rotatably mounted in the gearbox;
a gear assembly mounted in the gearbox, coupled to the transmission shaft and coupled to the main pinion, to act as a speed increaser or speed reducer between the bladed rotor wheel and the transmission shaft;
wherein at least one portion of the gearbox is removably connected to the fixed case; wherein the at least one portion supports the gear assembly and the transmission shaft, such that the at least one portion of the gearbox can be separated from the fixed case and the gear assembly with the transmission shaft can be separated from the main shaft;
wherein the gearbox is rigidly connected to the support assembly and the support assembly is removably mounted in the fixed case;
wherein the main shaft is connected to the bladed rotor wheel by a removable connection;
wherein the bladed rotor wheel can be locked in the fixed case;
wherein the main shaft is axially integral with the support assembly, so that the support assembly and the main shaft can be inserted into or withdrawn from the fixed case by displacement of at least a portion of the gearbox with respect to the fixed case and while the bladed rotor wheel remains locked in the fixed case.

2. The turbomachine according to claim 1, wherein the main shaft and the transmission shaft are aligned relative to each other and coaxial with each other.

3. The turbomachine according to claim 1, wherein the bladed rotor wheel is axially movable between an advanced working position in which it is free to rotate in the fixed case and a retracted locking position in which it rests tightly against the fixed case.

4. The turbomachine according to claim 1, wherein the gearbox comprises a first axial portion and a second axial portion connected to each other by means of removable connecting members; wherein the second axial portion is rigidly connected to the support assembly.

5. The turbomachine according to claim 4, wherein the support assembly comprises a sleeve and the support elements are bearings mounted in the sleeve, wherein the main shaft is supported by the bearings and wherein the second axial portion is rigidly connected to the sleeve.

6. The turbomachine according to claim 4, wherein the first axial portion or the second axial portion supports the gear assembly and the transmission shaft.

7. The turbomachine according to claim 5, wherein a rear end of the sleeve protrudes from the fixed case and the second axial portion is rigidly connected to the rear end.

8. The turbomachine according to claim 1, wherein the turbomachine is an expansion turbine.

9. The turbomachine according to claim 1, wherein the gear assembly comprises:
a drive pinion on the transmission shaft;
at least two driven shafts rotatably mounted in the gearbox; wherein each of the two driven shafts comprises a first driven wheel engaged with the main pinion and a second driven wheel engaged with the drive pinion.

10. The turbomachine according to claim 9, wherein the at least two driven shafts are arranged angularly equi-spaced around the main shaft and the transmission shaft.

11. The turbomachine according to claim 9, wherein the driven shafts are at least three.

12. The turbomachine according to claim 9, comprising axially yielding supports operatively interposed between the driven shafts and the gearbox.

13. The turbomachine according to claim 9, wherein the main pinion and the first driven wheels are of helical type and/or wherein the drive pinion and the second driven wheels are of helical type.

14. A method for disassembling a turbomachine according to claim 9, wherein the turbomachine further comprises a tie rod removably housed in an axial through-hole of the main shaft, the tie rod connected to the bladed rotor wheel and configured to join the main shaft and the bladed rotor wheel, wherein the gearbox comprises a first axial portion and a second axial portion connected to each other by means of removable connecting members, the second axial portion rigidly connected to the support assembly, wherein the method comprises:
removing the first axial portion of the gearbox, together with the transmission shaft and the gear assembly, from the second axial portion of the gearbox, disengaging and moving away the first driven wheels from the main pinion;
unlocking the tie rod from the main shaft;
disconnecting the second axial portion of the gearbox and the support assembly from the fixed case;
extracting the support assembly, integral with the second axial portion of the gearbox, together with the main shaft from the fixed case;
wherein the bladed rotor wheel is to be locked in the fixed case before the support assembly together with the main shaft is removed from the fixed case.

15. The method according to claim 14, comprising: resting the bladed rotor wheel tightly against an inner surface of the fixed case, to prevent leakage of the process liquid, before extracting the support assembly together with the main shaft from the fixed case.

16. The method for assembling a turbomachine according to claim 9, wherein the method comprises:

inserting the support assembly, integral with the second axial portion of the gearbox, together with the main shaft into the fixed case;

constraining the second axial portion of the gearbox and the support assembly to the fixed case;

locking the tie rod with the main shaft;

joining the first axial portion of the gearbox, together with the transmission shaft and the gear assembly, to the second axial portion of the gearbox, engaging the first driven wheels to the main pinion.

17. The turbomachine according to claim 1, comprising a tie rod removably housed in an axial through-hole of the main shaft, connected to the bladed rotor wheel and configured to join the main shaft and the bladed rotor wheel.

18. The turbomachine according to claim 17, wherein an end of the tie rod opposite the bladed rotor wheel is located in a seat fashioned in a proximal end of the transmission shaft.

19. The turbomachine according to claim 1, wherein a distal end of the transmission shaft protrudes from the gearbox and is configured to be connected to an operating machine or a driving machine.

20. An industrial power plant comprising at least one turbomachine with cantilevered rotor wheel according to claim 1, wherein the turbomachine with cantilevered rotor wheel of the industrial plant is an expansion turbine coupled to a generator.

21. A plant according to claim 20, wherein the industrial plant is of the Organic Rankine Cycle (ORC) type.

\* \* \* \* \*